United States Patent [19]

Brunelle

[11] 4,363,905
[45] * Dec. 14, 1982

[54] POLYCARBONATE TRANSESTERIFICATION FROM BIS(ORTHO-NITROARYL)CARBONATE

[75] Inventor: Daniel J. Brunelle, Scotia, N.Y.

[73] Assignee: General Electric Company, Schenectady, N.Y.

[*] Notice: The portion of the term of this patent subsequent to Feb. 23, 1999, has been disclaimed.

[21] Appl. No.: 143,805

[22] Filed: Apr. 23, 1980

[51] Int. Cl.$^3$ ............................................. C08G 63/62
[52] U.S. Cl. .................................... 528/196; 528/198; 528/199; 528/200; 528/202; 528/203
[58] Field of Search ............... 528/196, 198, 199, 200, 528/202, 203

[56] References Cited

U.S. PATENT DOCUMENTS 3,014,891  12/1961  Goldblum .......................... 528/203

Primary Examiner—Harold D. Anderson
Attorney, Agent, or Firm—Peter A. Bielinski; James C. Davis, Jr.; Marvin Snyder

[57] ABSTRACT

A polycarbonate transesterification process comprising reacting a bis(ortho-nitroaryl)carbonate and a dihydric phenol under transesterification reaction conditions.

12 Claims, No Drawings

POLYCARBONATE TRANSESTERIFICATION FROM BIS(ORTHO-NITROARYL)CARBONATE

CROSS REFERENCE TO RELATED APPLICATIONS

This invention is related to U.S. patent applications Ser. No. 106,855 filed Dec. 26, 1979 was abandoned by which Ser No. 262,287, filed May 11, 1981 is a continuation in part; Ser. No. 106,856 filed Dec. 26, 1979 was abandoned and Ser. No. 258,124, filed Apr. 27, 1981 is a continuation in part; all of Daniel Joseph Brunelle, and U.S. Pat. No. 4,217,438 filed Dec. 15, 1978 of Daniel Joseph Brunelle and William Edward Smith. The above applications are assigned to the assignee of this invention and all of their disclosures are incorporated herein in their entirety by reference.

BACKGROUND OF THE INVENTION

1. Field of the Invention

This invention relates to a polycarbonate transesterification process comprising reacting a bis(ortho-nitroaryl)-carbonate and a dihydric phenol under transesterification reaction conditions.

2. Description of the Prior Art

In general, polycarbonate transesterification prior art including The Encyclopedia of Polymer Science, Vol. 10 (1969), Chemistry and Physics of Polycarbonates, Polymer Reviews, H. Schnell, Vol. 9, John Wiley and Sons, Inc. (1964); "Polycarbonates", Christopher and Fox, Reinhold Corporation of New York (1962); among other publications, including numerous U.S. and foreign patents including Great Britain Pat. No. 1,079,822 issued to Bayer (1966), authored by Curtius, Ludwig, Bottenbruch and Schnell, report that generally effective transesterification reactions involving aromatic dihydroxy compounds with carbonic acid aromatic diesters can be carried out in the presence of basic catalysts in the formation of high molecular weight impact-resistant thermoplastic polycarbonates.

DESCRIPTION OF THE INVENTION

This invention embodies a polycarbonate transesterification process comprising reacting a bis(ortho-nitroary)-carbonate and a dihydric phenol under transesterification reaction conditions.

The "bis(ortho-nitroaryl)carbonate" also commonly referred to as a carbonic acid aromatic diester of an orthonitrophenol is defined herein by the general formula:

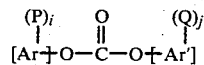

where at least a P or Q substituent is an ortho-positioned nitro, e.g. -NO$_2$ group, directly bonded to a ring carbon atom located adjacent to an oxy group of the carbonate, i and j represent whole numbers of at least 1 up to a maximum equivalent to the number of replaceable hydrogen atoms or other groups, e.g. C$_{1-4}$ alkyl, substituted for on the aromatic rings comprising Ar and Ar'. Optionally a P and/or Q substituent—subject to the proviso that at least one P or Q is a nitro group—can be an ortho positioned halogen, e.g. Cl, F, Br, or I or a trifluoromethyl group.

Presently preferred bis(ortho-nitroaryl)carbonates, including mixtures thereof, are of the formula:

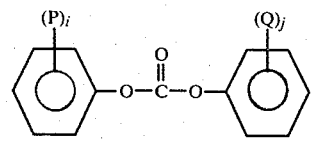

where independently at least a P or Q is an ortho-positioned nitro group, i and j are as defined above. Specific examples follow:

bis(o-nitrophenyl)carbonate,
o-nitrophenyl-o-chlorophenyl carbonate,
bis(2-nitro-4-methylphenyl)carbonate,
o-nitrophenyl o-trifluoromethylphenyl carbonate,
o-nitrophenyl-o-bromophenyl carbonate,
bis(2-nitro-3-methylphenyl)carbonate,
bis(2-nitro-4-ethylphenyl)carbonate,
bis(2-nitro-5-propylphenyl)carbonate, and
bis(2-nitro-6-butylphenyl)carbonate, etc.

Another embodiment of this patent comprises the use of mixtures of bis(ortho-nitroaryl) and ortho-nitroaryl aryl carbonates.

The "ortho-nitroaryl aryl carbonate"—which can also be referred to as a carbonic acid aromatic diester of an orthonitrophenol and a phenol—is defined herein by the general formula:

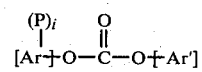

where P is as defined above, i represents a whole number of at least 1 up to a maximum equivalent to the number of replaceable hydrogen atoms or other groups, e.g. C$_{1-4}$ alkyl, substituted for on the aromatic ring comprising Ar, Ar' being an aromatic ring.

Presently preferred ortho-nitroaryl aryl carbonates, including mixtures thereof, are of the formula:

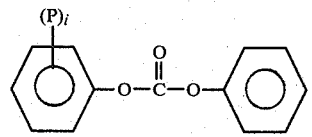

where independently P is an ortho-positioned nitro group, and i is as defined above. Specific examples follow:

o-nitrophenyl phenyl carbonate,
o-nitro-p-methylphenyl phenyl carbonate,
o-nitro-p-chlorophenyl phenyl carbonate,
o-nitro-o-trifluoromethylphenyl phenyl carbonate, and
o-nitro-p-butylphenyl phenyl carbonate, etc.

Sterically hindered "bis(ortho-nitroaryl)carbonates" or "ortho-nitroaryl aryl carbonates" having P and Q substituents positioned on all available ortho positions of the same aromatic ring are excluded as reactants in this patent.

Any of the dihydric phenols, bases, reaction parameters relative to amounts of reactants, etc., as well as reaction time, temperature and pressure described in U.S. Pat. No. 4,217,438 of D. J. Brunelle and W. E. Smith can be employed in the process of this patent. Accordingly, for brevity their descriptions are incorporated herein in their entirety by reference.

Illustratively, "dihydric phenols" include dihydric or dihydroxy aromatic compounds—also incorporated herein by reference—defined by Fox's Formula II in U.S. Pat. No. 3,153,008, column 2, lines 23-72 and column 3, lines 1-42. Presently preferred dihydric phenols are of the formulas:

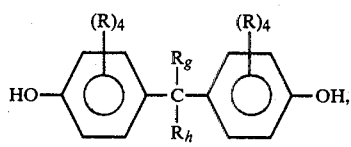

where independently each R is hydrogen, $C_{1-4}$ alkyl, methoxy, bromine and chlorine, $R_g$ and $R_h$ are hydrogen or a $C_{1-30}$ monovalent hydrocarbon or hydrocarbonoxy group, and

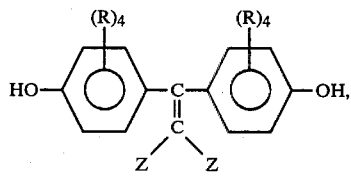

where independently each R is as defined above and each Z is hydrogen, chlorine or bromine, subject to the proviso that at least one Z is chlorine or bromine.

Specific examples follow:
4,4'-dihydroxy-diphenyl-1,1-butane,
4,4'-dihydroxy-diphenyl-2-chlorophenyl methane,
4,4'-dihydroxy-diphenyl-2,2-propane also known as "BPA" or bis(4-hydroxyphenyl)propane-2,2,
4,4'-dihydroxy-3-methoxy-diphenyl-2,2-propane,
4,4'-dihydroxy-3-isopropyl-diphenyl-2,2-propane,
4,4'-dihydroxy-diphenyl-2,2-nonane,
4,4'-dihydroxy-2,2',3,3',5,5',6,6'-octamethyl-diphenyl methane,
4,4'-dihydroxy-2,2'-dimethyl-5,5'-di-tert.-butyldiphenyl methane,
4,4'-dihydroxy-3,3',5,5'-tetrachloro-diphenyl-2,2-propane,
4,4'-dihydroxy-3,3',5,5'-tetrabromo-diphenyl-2,2-propane,
1,1-dichloro-2,2-bis(4-hydroxphenyl)ethylene,
1,1-dibromo-2,2-bis(4-hydroxyphenyl)ethylene,
1,1-dichloro-2,2-bis(5-methyl-4-hydroxyphenyl)ethylene,
1,1-dibromo-2,2-bis(3,6-n-butyl-4-hydroxyphenyl)-ethylene,
1,1-dichloro-2,2-bis(2-chloro-5-ethyl-4-hydroxyphenyl)-ethylene,
1-bromo-2,2-bis(4-hydroxyphenyl)ethylene,
1,1-dichloro-2,2-bis(2-ethoxy-4-hydroxphenyl)ethylene, and
1-bromo-2,2-bis(3,5-diphenylether-4-hydroxyphenyl)-ethylene, etc.

This process is carried out under basic reaction conditions. Illustrative of basic species which can be employed are the following: elemental alkali and alkaline earth metals, basic quaternary ammonium, quaternary phosphonium or tertiary sulfonium compounds; alkaline earth metal hydroxides; salts of strong bases and weak organic acids; primary, secondary or tertiary amines; etc. Specific examples of the aforementioned are sodium, potassium, magnesium metals; quaternary ammonium hydroxide, tetramethyl ammonium borontetrahydride, tetraethyl phosphonium hydroxide; sodium, potassium, lithium, and calcium hydroxide; sodium, lithium and barium carbonate; sodium acetate; sodium benzoate; sodium methylate; sodium thiosulfate; sodium compounds, e.g. sulfide, tetrasulfide, cyanide, hydride and borohydride; potassium fluoride; methylamine; isopropylamine; methylethylamine; allylethylamine; ditertbutylamine, dicyclohexylamine; dibenzylamine; tertbutylamine; allyldiethylamine; benzyldimethylamine; diacetylchlorobenzylamine; dimethylphenethylamine; 1-dimethylamino-2-phenylpropane; propanediamine; ethylenediamine; N-methylethylenediamine; N,N'-dimethylethylenediamine; N,N,N'-tritertbutyl-propanediamine; N,N',N',N"-tetramethyldiethylenetriamine; pyridine; aminomethylpyridines; pyrrole; pyrrolidine; piperidine; 1,2,2,6,6-pentamethylpiperidine; imidazole; etc. Especially preferred bases are the hydroxides of lithium, sodium, potassium, calcium or barium; sodium, lithium or barium carbonate; sodium acetate; sodium benzoate, sodium methylate, lithium, sodium or potassium salts of 2,2,2-trifluoroethanol, etc., including mixtures of any of the above.

Preferably and accordingly—optionally, the process can be carried out in the presence of any organic phase transfer agent (PTA), including, but not limited to, any onium phase transfer agent, e.g. quaternary ammonium hydroxide, tetraethyl phosphonium hydroxide, etc., as described by C. M. Starks, J.A.C.A. 93 195 (1971); any crown ether phase transfer agent, e.g. Aldrichimica ACTA 9, Issue #1 (1976) Crown Ether Chemistry:Principles and Applications, G. W. Gokel and H. D. Durst, as well as C. J. Pederson in U.S. Pat. No 3,622,577, etc.; any chelated cationic salt, e.g. alkaline or alkali earth metal diamine halides; cryptates, etc., i.e. any agent which is soluble in the organic phase and which enhances the transfer, maintenance, or retention of an anion, e.g. a halide.

The process can be carried out in the absence of any solvent, e.g. where the dihydric phenol or bis(orthonitroaryl)-carbonate act as both reactant and solvent. Generally, preferably the process is carried out in the presence of nonpolar to medium polar solvent—subject to the proviso, more preferably, that the solvent employed be substantially free of protic solvents, especially protic solvents capable of strong hydrogen bonding.

In general, presently, among the most preferred solvents are the following:

Medium-polarity solvents such as methylene chloride, chloroform, 1,2-dichloroethane, chlorobenzene, anisol, bromobenzene, dichlorobenzenes, methyl formate, iodobenzene, acetone, acetophenone, etc., also including mixtures of any of the above. Although less preferred when contrasted with medium-polarity solvents are non- or low-polar solvents, such as hexane, 3-methylpentane, heptane, cyclohexane, methylcyclohexane, cyclohexane, isooctane, p-cymene, cumene, decalin, toluene, xylene benzene, diethylether, diphenyl ether, dioxane, thiophene, dimethylsulfide, ethyl acetate, tetrahydrofuran, etc., including mixtures of any of the above.

Any amount of base can be employed. In general, effective mole ratios of base, e.g. LiOH, LiAlH$_4$, to dihydric phenols are within the range of from about $1 \times 10^{-8}$ to 1 or even lower to about 1 to 1, or even higher preferably from $1 \times 10^{-6}$ to 1 to about $2 \times 10^{-3}$ to 1, and more preferably from $1 \times 10^{-5}$ to 1 to $1 \times 10^{-3}$ to 1. Generally, mole ratios of at least $1\times 10^{-3}$ to 1 enhances both the reaction rate and the yield of polycarbonate.

Any amount of phase transfer agent can be employed. In general, effective mole ratios of phase transfer agent to base are within the range of from about $1\times 10^{-3}$ to 1 to about $1\times 10^2$ to 1 or higher, preferably from about $1\times 10^{-2}$ to 1 to about 10 to 1, and more preferably from about $1\times 10^{-1}$ to 1 to 1 to 1.

Any reaction pressure can be employed, e.g. atmosphere, subatmosphere or superatmospheric. Generally, however, the process is preferably carried out under a reaction pressure of approximately 1 atm. (~760 mm. Hg) during the initial phase of the reaction with a subsequent pressure reduction to values in the order of 1.0 to 0.1 mm Hg (vacuum), or even lower.

Any reaction temperature can be employed. Optimum reaction temperatures are generally within the range of from 80° C. or even lower, to 300° C. or even higher, and more often 120° C. to 260° C.

Any reaction time can be employed. Generally, optimum reaction time periods are from about 0.5 hours or even less to about 24 hours or even more.

BEST MODE

EXAMPLES I and II 4.564 g. of bis(4-hydroxyphenyl)propane-2,2 (20 mmol.) and 6.08 g. of bis(o-nitrophenyl)carbonate (20 mmol.) under an air atmosphere were preheated for 5 minutes to a temperature of about 150° C. The resulting melt mixture was charged with $1\times 10^{-3}$ mole percent sodium phenolate ($C_6H_5ONa$) catalyst (relative to BPA) added in combination with $1\times 10^{-3}$ mole percent phase transfer agent (relative to base). After the catalyst/phase transfer agent addition, the following conditions were employed: 150° C./atmospheric pressure for 30 minutes, 150° C. at 15 mm Hg (vacuum) for 15 minutes, and then 150° C. to 200° C. at 15 mm Hg (vacuum) during the next 30 minutes. By-product o-nitrophenol was removed via distillation during the last phase of the reaction i.e. when the melt temperature was maintained at 150°-200° C. at 15 mm Hg for 30 minutes. A control-contrast reaction was carried out under equivalent reaction conditions substituting diphenylcarbonate for bis(o-nitrophenyl)carbonate.

TABLE I

| Summary of Single Stage Reaction Parameters | | | | |
|---|---|---|---|---|
| Process Sequence | Cumulative Reaction Time/hr. | Time Individual Interval/hr. | Temp. °C. | Pressure Hg. |
| Single Stage | 0.50 | 0.5 | 150 | atm./760 mm |
|  | 0.75 | 0.25 | 150 | vacuum 15 mm |
|  | 1.25 | 0.50 | 150-200 | vacuum 15 mm |
| Summary | 1.25 | N.A.[1] | 150-200 | atm./760-15 mm |

TABLE II

| Example No. | Stage | Primary Carbonate Starting Material | BPA-Polycarbonate | | |
|---|---|---|---|---|---|
|  |  |  | Color[2] | $MW_w$[3] | $MW_n$[3] |
| I | single | bis(o-nitrophenyl)carbonate | colorless | 77,000 | 30,500 |

TABLE II-continued

| Example No. | Stage | Primary Carbonate Starting Material | BPA-Polycarbonate | | |
|---|---|---|---|---|---|
|  |  |  | Color[2] | $MW_w$[3] | $MW_n$[3] |
| II | single | diphenylcarbonate | " | 3,500 | 1,200 |

FOOTNOTES:
[1] = not applicable
[2] = color of product after methanol precipitation
[3] = GPC Gas Phase Chromotography wt. avg. MW, rel. to polystyrene

EXAMPLES III to IX

A series of transesterification reactions were carried out under equilibration reaction conditions, i.e. no removal of any by-product phenol, e.g. ortho-nitrophenol, via distillation. The reactions illustrate the enhanced reactivity bis(ortho-nitrophenyl)carbonate relative to diphenylcarbonate or bis(ortho-chlorophenyl)carbonate out under equivalent reaction conditions.

2.283 g. of bis(4-hydroxyphenyl)propane-2,2 (10.0 mmol. mmol.) and 3.042 g. of bis(o-nitrophenyl)carbonate (10.0 mmol.) were heated in the presence of $1\times 10^{-3}$ mole percent sodium phenolate, i.e. $NaOC_6H_5$, for about 60 minutes at about 150° C. under equilibration reaction conditions. Phase transfer agent when employed was present in an amount of $1\times 10^{-3}$ mol.% based on BPA. A summary of the process parameters as well as the properties of the resulting polycarbonate are set out in Table III hereafter.

TABLE III

| Example No. | Carbonate Substrate | Catalyst | Phase Transfer[5] Agent | BPA-Polycarbonate | |
|---|---|---|---|---|---|
|  |  |  |  | Color[2] | $MW_w$[3] |
| III | bis(o-nitrophenyl)carbonate | $C_6H_5ONa$ | $Bu_4PBr$ | colorless | 8,400 |
| IV | bis(o-nitrophenyl)carbonate | " | 18-Crown-6 | colorless | 7,400 |
| V | bis(o-nitrophenyl)carbonate | " | $Bu_4NBr$ | colorless | 7,200 |
| VI | bis(o-chlorophenyl)carbonate | " | $Bu_4PBr$ | colorless | 1,700 |
| VII | bis(o-chlorophenyl)carbonate | " | none | colorless | 900 |
| VIII | diphenylcarbonate | " | $Bu_4PBr$ | colorless | 400 |
| IX | diphenylcarbonate | " | none | colorless | 330 |

FOOTNOTES:
[2,3] = same as previous examples.
[5] = $Bu_4PBr$: tetrabutyl phosphonium bromide
$Bu_4NBr$: tetrabutyl ammonium bromide In general, the use of bis(nitro-aryl)carbonates—especially in the presence of a phase transfer agent—in a polycarbonate transesterification process provides advantages not associated with other carbonate transesterification substrates, such as bis(ortho-chlorophenyl)carbonate or diphenylcarbonate. The use of bis(ortho-nitroaryl)carbonate substrates provides—when contrasted with other carbonate substrates—the following advantages: (1) improved transesterification reaction rate, (2) milder transesterification reaction conditions including significantly lower reaction temperatures, (3) reduced amounts of carbonate substrate since only stoichiometric amounts or amounts slightly in excess, e.g. 0 to 1%, are required for complete conversion of all dihydric phenol to polycarbonate, and (4) reduced quantities of catalyst at improved reaction rate, temperature and pressure transesterification reaction conditions. The use of mixtures of bis(nitro-aryl)carbonates and nitro-aryl aryl carbonates provides in addition to the above advantages controlled aryl end-capping of the resulting polycarbonate.

Illustratively the transesterified polycarbonate end products derived from the process of this patent, preferably, exhibit intrinsic viscosities of at least 0.3 and more preferably about 0.5 deciliters per gram (dl./g.) as measured in either methylene chloride or chloroform or similar solvent systems at 25° C. The upper intrinsic viscosity number is not critical, however, it will generally be about 1.5 dl/g. Especially useful polycarbonates generally have an intrinsic viscosity within the range of from about 0.38 to about 0.7 dl./g. Preferably, the polycarbonates have a number average molecular weight of at least about 5,000, and more preferably from about 10,000 to about 50,000. Polycarbonates of such molecular weight characteristics process easily inbetween about 450° F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

I claim:

1. A thermoplastic polycarbonate transesterification process comprising reacting (A) a bis(ortho-nitroaryl)carbonate of the formula,

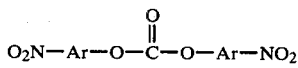

wherein Ar is an aromatic ring; with (B) a dihydric phenol under basic reaction conditions including a phase transfer catalyst.

2. A thermoplastic polycarbonate transesterification process comprising reacting (A) a bis(ortho-nitroaryl)carbonate of the formula:

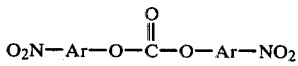

wherein Ar is an aromatic ring; with (B) bis(4-hydroxyphenyl)propane-2,2 under basic reaction conditions including a phase transfer catalyst.

3. The claim 1 process where the dihydric phenol is of the formula:

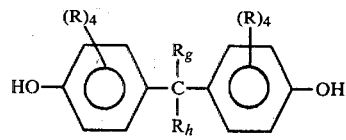

where independently each R is hydrogen, $C_{1-4}$ alkyl, methoxy, bromine or chlorine, $R_g$ and $R_h$ are hydrogen or a $C_{1-30}$ monovalent hydrocarbon or hydrocarbonoxy group, or of the formula:

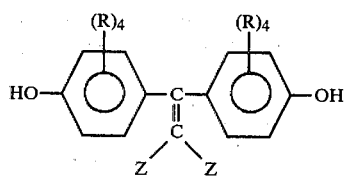

where independently each R is as defined previously and each Z is hydrogen, chlorine or bromine, subject to the proviso that at least one Z is chlorine or bromine.

4. The claim 1 process further comprising transesterification reaction conditions at temperatures of from 80° C. to 300° C. and a pressure of from about atmospheric pressure to about 0.1 mm Hg vacuum.

5. The claim 1 process where the carbonate is bis-(o-nitrophenyl)carbonate.

6. The claim 5 process where the dihydric phenol is bis(4-hydroxyphenyl)propane-2,2.

7. The claim 1 process further comprising a non-, low-, or medium polar solvent.

8. The claim 1 process further comprising transesterification reaction conditions at temperatures of from 80° C. to 300° C. and a pressure of from about atmospheric pressure to about 0.1 mm Hg vacuum.

9. The claim 8 process where said temperature is about 120° C. to 260° C.

10. The claim 9 process where said temperature is about 200° C. and the vacuum is 15 mm Hg.

11. The claim 4 process where said temperature is about 120° C. to 260° C.

12. The claim 11 process where said temperature is about 200° C. and said vacuum is about 15 mm Hg.

* * * * *